United States Patent
Xu et al.

(10) Patent No.: US 11,700,452 B2
(45) Date of Patent: Jul. 11, 2023

(54) PHOTOGRAPHING METHOD AND ELECTRONIC DEVICE

(71) Applicant: HUAWEI TECHNOLOGIES CO., LTD., Guangdong (CN)

(72) Inventors: Rongyue Xu, Shenzhen (CN); Huanhuan Ao, Shanghai (CN); Yuanyou Li, Oerlikon (CH); Congchao Zhu, Shenzhen (CN); Jieguang Huo, Shenzhen (CN); Cheng Du, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/636,954

(22) PCT Filed: Aug. 19, 2020

(86) PCT No.: PCT/CN2020/110008
§ 371 (c)(1),
(2) Date: Feb. 21, 2022

(87) PCT Pub. No.: WO2021/032117
PCT Pub. Date: Feb. 25, 2021

(65) Prior Publication Data
US 2022/0360715 A1    Nov. 10, 2022

(30) Foreign Application Priority Data

Aug. 22, 2019   (CN) .......................... 201910780029.9

(51) Int. Cl.
*H04N 23/69* (2023.01)
*H04N 23/63* (2023.01)

(52) U.S. Cl.
CPC ........... *H04N 23/69* (2023.01); *H04N 23/631* (2023.01); *H04N 23/635* (2023.01)

(58) Field of Classification Search
CPC ......... H04N 5/23274; H04N 5/232935; H04N 5/23296; H04N 5/232945; H04N 5/23264;
(Continued)

(56) References Cited

U.S. PATENT DOCUMENTS 8,154,623 B2 *   4/2012   Fujita ................. H04N 5/23296
                                                                  348/240.1
9,781,350 B2 *  10/2017   Gao ........................... G06T 7/74
(Continued)

FOREIGN PATENT DOCUMENTS

CN         102055908 A         5/2011
CN         104052923 A         9/2014
(Continued)

*Primary Examiner* — Pritham D Prabhakher
(74) *Attorney, Agent, or Firm* — Womble Bond Dickinson (US) LLP

(57) ABSTRACT

This application provides a photographing method and an electronic device, and relates to the field of terminal technologies, to ensure stabilization performance existing during photographing in a zoom scenario, and improve definition of a photographing image. The method includes: obtaining a first photographing image through a first camera; determining a first crop ratio of the first photographing image based on a first zoom ratio of the first photographing image; cropping the first photographing image based on the first crop ratio; obtaining a second photographing image through the first camera in response to a first zoom operation; and cropping the second photographing image based on the second crop ratio; wherein the second crop ratio is greater than the first crop ratio, and a stabilization angle of the second photographing image is a product of the FOV of the first camera and the second crop ratio.

18 Claims, 15 Drawing Sheets

(58) Field of Classification Search
CPC ......... H04N 5/232933; H04N 5/23222; H04N 5/2328; H04N 5/23258; G01S 3/00; G01S 3/7864; G01S 5/16; G06T 7/337; G06T 7/74; G06T 7/20
USPC ...................................................... 348/240.3
See application file for complete search history.

(56) References Cited

U.S. PATENT DOCUMENTS

| | | | | |
|---|---|---|---|---|
| 9,967,461 | B2* | 5/2018 | Hong | ......................... G06T 5/20 |
| 10,142,549 | B2* | 11/2018 | Wang | ................... H04N 5/2258 |
| 10,484,600 | B2* | 11/2019 | Baek | ..................... H04N 5/2258 |
| 2009/0167897 | A1 | 7/2009 | Fujita | |
| 2016/0007008 | A1* | 1/2016 | Molgaard | .......... H04N 5/23216 |
| | | | | 348/47 |
| 2016/0173782 | A1* | 6/2016 | Dimson | ............. H04N 5/23267 |
| | | | | 386/226 |
| 2016/0241793 | A1* | 8/2016 | Ravirala | ............. H04N 5/23296 |
| 2017/0094184 | A1 | 3/2017 | Gao et al. | |
| 2017/0104938 | A1* | 4/2017 | Shimosato | ......... H04N 5/23296 |
| 2017/0111584 | A1* | 4/2017 | Hong | .................. H04N 5/23296 |
| 2017/0272661 | A1* | 9/2017 | Tsubusaki | ........ H04N 5/232123 |
| 2018/0048825 | A1* | 2/2018 | Wang | ..................... G02B 13/02 |
| 2018/0070009 | A1* | 3/2018 | Baek | .................. H04N 5/23232 |
| 2018/0227492 | A1* | 8/2018 | Hong | .................. H04N 5/23296 |
| 2019/0132522 | A1* | 5/2019 | Tsubusaki | ........... H04N 5/23258 |

FOREIGN PATENT DOCUMENTS

| | | |
|---|---|---|
| CN | 106454105 A | 2/2017 |
| CN | 106998459 A | 8/2017 |
| CN | 109831622 A | 5/2019 |
| CN | 110072070 A | 7/2019 |
| JP | H09102903 A | 4/1997 |

\* cited by examiner

PHOTOGRAPHING METHOD AND ELECTRONIC DEVICE

CROSS-REFERENCE TO RELATED APPLICATIONS

This application is a national stage of International Application No. PCT/CN2020/110008, filed on Aug. 19, 2020, which claims priority to Chinese Patent Application No. 201910780029.9, filed on Aug. 22, 2019. Both of the aforementioned applications are hereby incorporated by reference in their entireties.

TECHNICAL FIELD

This application relates to the field of terminal technologies, and in particular, to a photographing method and an electronic device.

BACKGROUND

Photographing functions (for example, photo and video) of a camera app in a mobile phone have been widely used in daily life of a user. However, in a handheld condition, a shake phenomenon may occur in a photo or video captured by the user through the camera app, affecting definition of a photographing image.

Currently, a stabilization algorithm may be preset in some mobile phones, to reduce an image blur problem caused by a shake during photographing. Usually, a stabilization angle in the stabilization algorithm is positively correlated with a field of view (FOV) of a photographing image. For example, when the FOV of the photographing image is 80°, a corresponding stabilization angle is 8°; or when the FOV of the photographing image is 40°, a corresponding stabilization angle is 4°.

In this case, in a photographing process, if the user enlarges the photographing image by N times in a digital zoom manner, the FOV of the photographing image is also reduced by N times accordingly, and correspondingly, the stabilization angle of the photographing image is also reduced by N times accordingly. Consequently, a stabilization effect of the mobile phone is significantly reduced, and definition of the photographing image obtained through high-magnification zoom photographing is poor.

SUMMARY

This application provides a photographing method and an electronic device, to ensure stabilization performance existing during photographing in a zoom scenario, improve definition of a photographing image, and improve photographing experience of a user.

To achieve the foregoing objective, the following technical solutions are used in this application.

According to a first aspect, this application provides a photographing method, including: An electronic device obtains a first photographing image through a first camera; further, the electronic device may determine a first crop ratio of the first photographing image based on a first zoom ratio of the first photographing image, where a stabilization angle of the first photographing image is a product of an FOV of the first camera and the first crop ratio; the electronic device crops the first photographing image based on the first crop ratio, to obtain and output a first cropped image; subsequently, if it is detected that a user enters a first zoom operation, the electronic device may obtain a second photographing image through the first camera; similarly, the electronic device may determine a second crop ratio of the second photographing image based on a second zoom ratio of the second photographing image, where the second zoom ratio is greater than the first zoom ratio, the second crop ratio is greater than the first crop ratio, and a stabilization angle of the second photographing image is a product of the FOV of the first camera and the second crop ratio; and the electronic device crops the second photographing image based on the second crop ratio, to obtain and output a second cropped image.

It can be learned that after obtaining each frame of photographing image, the electronic device may dynamically set a crop ratio of a current photographing image based on a zoom ratio of the current photographing image, and further crop the current photographing image based on the crop ratio. A larger zoom ratio indicates to set a larger crop ratio for a photographing image. Therefore, a larger zoom ratio indicates that a larger stabilization angle that may be used to compensate for an image shake remains in the photographing image when the electronic device crops the photographing image. Therefore, in a high-magnification zoom photographing scenario, the electronic device may still calibrate a photographing image with a large shake angle, to improve stabilization performance existing during capturing of an image and photographing experience of the user.

In an embodiment, that the electronic device determines a first crop ratio of the first photographing image based on a first zoom ratio includes: The electronic device calculates the first crop ratio based on the first zoom ratio according to a preset formula; and similarly, that the electronic device determines a second crop ratio of the second photographing image based on a second zoom ratio includes: The electronic device calculates the second crop ratio based on the second zoom ratio according to the preset formula.

The preset formula is:

$$\text{crop\_ratio} = \left(\frac{1 - \frac{1}{\text{zoom\_ratio}}}{2}\right) + \frac{1}{\text{zoom\_ratio}} * \text{init\_ratio}.$$

Herein, zoom_ratio is a current zoom ratio, and init_ratio is a constant.

In other words, the electronic device may determine a corresponding crop ratio (namely, crop_ratio) for the photographing image at one time with reference to the current zoom ratio, and subsequently, the electronic device only needs to crop the photographing image for one time based on the crop ratio. Therefore, the electronic device may perform cropping for one time based on the entire photographing image, and a stabilization angle that may be used to compensate for the image shake in a cropping process is increased, so that a stable photographing effect of a photographing image captured by the electronic device can still be obtained when there is a large shake.

Alternatively, the electronic device may store correspondences between different zoom ratios and different zoom ratios. In this case, that the electronic device determines a first crop ratio of the first photographing image based on a first zoom ratio includes: The electronic device determines, based on the correspondences, a first crop ratio corresponding to the first zoom ratio; and similarly, that the electronic device determines a second crop ratio of the second photographing image based on a second zoom ratio includes: The electronic device determines, based on the correspondences, a second crop ratio corresponding to the second zoom ratio.

It should be noted that a larger zoom ratio indicates to set a larger crop ratio for a photographing image. However, a stabilization angle of the photographing image is a product of an FOV of a camera and a crop ratio. In this case, when the FOV of the camera is fixed, a larger zoom ratio indicates a larger stabilization angle corresponding to the photographing image and a higher stabilization capability of the electronic device.

In an embodiment, that the electronic device crops the first photographing image based on the first crop ratio, to obtain a first cropped image includes: The electronic device calculates a size of a first crop box based on the first crop ratio; the electronic device determines a location of the first crop box in the first photographing image; and the electronic device may crop the first photographing image along the location of the first crop box, to obtain the first cropped image.

For example, that the electronic device determines a location of the first crop box in the first photographing image includes: The electronic device obtains a first shake direction and a first shake amount on an x-axis of the first photographing image, and obtains a second shake direction and a second shake amount on a y-axis of the first photographing image; and to compensate for a shake that is generated on the x-axis and the y-axis of the first photographing image, the electronic device may move, starting from a first initial location (to be specific, the first crop box is located in a center of the first photographing image), the first crop box by the first shake amount on the x-axis in a direction opposite to the first shake direction, and move the first crop box by the second shake amount on the y-axis in a direction opposite to the second shake direction.

Similarly, that the electronic device crops the second photographing image based on the second crop ratio, to obtain a second cropped image includes: The electronic device calculates a size of a second crop box based on the second crop ratio; the electronic device determines a location of the second crop box in the second photographing image; and the electronic device may crop the second photographing image along the location of the second crop box, to obtain the second cropped image.

For example, that the electronic device determines a location of the second crop box in the second photographing image includes: The electronic device obtains a first shake direction and a first shake amount on an x-axis of the second photographing image, and obtains a second shake direction and a second shake amount on a y-axis of the second photographing image; and the electronic device may move, starting from a second initial location (to be specific, the second crop box is located in a center of the second photographing image), the second crop box by the first shake amount on the x-axis in a direction opposite to the first shake direction, and move the second crop box by the second shake amount on the y-axis in a direction opposite to the second shake direction.

In other words, the electronic device may adjust a location of a crop box in each frame of photographing image, to compensate for an image offset generated due to a shake, so that a stabilization effect of the electronic device is significantly improved.

In an embodiment, the first crop box includes a moving object in the first photographing image, and the second crop box includes a moving object in the second photographing image. In other words, the electronic device may determine the crop ratio of the current photographing image based on the current zoom ratio, and retain a moving object in the photographing image based on the crop ratio, so that the moving object can smoothly appear on a main location in the photographing image, to reduce composition difficulty existing when the user performs photographing.

In an embodiment, the method further includes: The electronic device obtains a third photographing image through a second camera in response to a second zoom operation entered by the user, where an FOV of the second camera is different from the FOV of the first camera. In other words, after detecting a zoom operation entered by the user, the electronic device may further replace a camera that is being used.

In an embodiment, that an electronic device obtains a first photographing image through a first camera includes: The electronic device may obtain the first photographing image through the first camera in a preview scenario, a video capturing scenario, or a photo capturing scenario. In other words, in any one of the photo capturing scenario, the video capturing scenario, the preview scenario, or a recording scenario, after obtaining each frame of photographing image, the electronic device may dynamically set the crop ratio of the current photographing image based on the current zoom ratio. A larger zoom ratio indicates to set a larger crop ratio for a photographing image. Therefore, a larger zoom ratio indicates a larger stabilization angle corresponding to the photographing image. Therefore, in a high-magnification zoom photographing scenario, the electronic device may still calibrate the photographing image with a large shake angle, to improve stabilization performance existing during capturing of an image and photographing experience of the user.

According to a second aspect, this application provides an electronic device, including a touchscreen, one or more processors, one or more cameras, a memory, and one or more computer programs. The processor is coupled to the touchscreen, the camera, and the memory. The one or more computer programs are stored in the memory. When the electronic device runs, the processor executes the one or more computer programs stored in the memory, so that the electronic device performs the photographing method according to any one of the first aspect and the possible an embodiment of the first aspect.

According to a third aspect, this application provides a computer storage medium, including computer instructions. When the computer instructions are run on an electronic device, the electronic device is enabled to perform the photographing method according to any possible implementations of the first aspect.

According to a fourth aspect, this application provides a computer program product. When the computer program product runs on an electronic device, the electronic device is enabled to perform the photographing method according to any possible implementations of the first aspect.

It may be understood that, the electronic device in the second aspect, the computer storage medium in the third aspect, and the computer program product in the fourth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described again herein.

DESCRIPTION OF EMBODIMENTS

The following describes implementations of the embodiments of this application in detail with reference to the accompanying drawings.

For example, a photographing method provided in the embodiments of this application may be applied to an electronic device such as a mobile phone, a tablet computer, a laptop computer, an ultra-mobile personal computer (UMPC), a handheld computer, a netbook, a personal digital assistant (PDA), a wearable electronic device, or a virtual reality device. This is not limited in the embodiments of this application.

Figure 1:
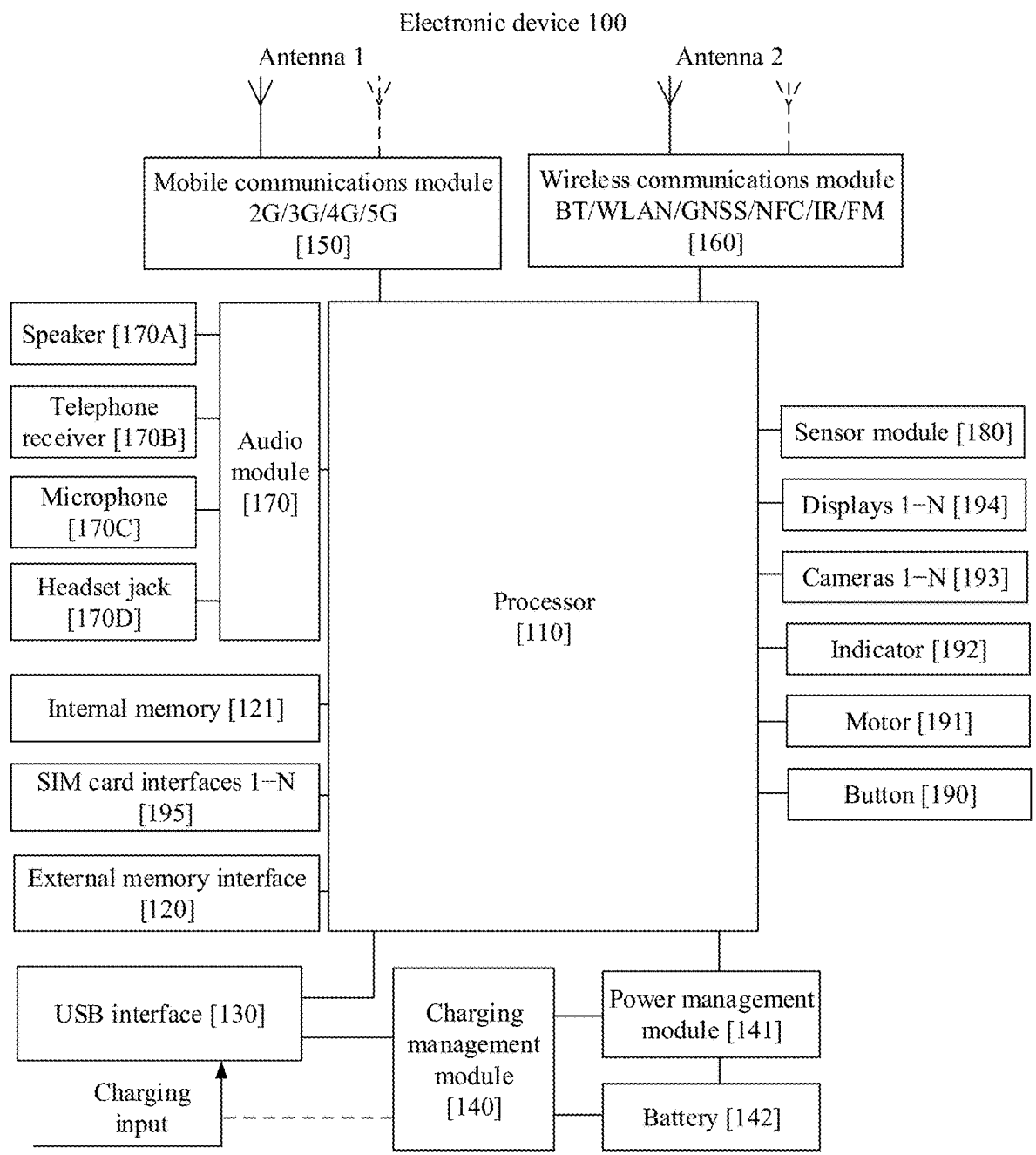
FIG. 1 is a schematic diagram 1 of a structure of an electronic device according to an embodiment of this application.

For example, FIG. 1 is a schematic diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

It can be understood that the structure shown in an embodiment of the present disclosure does not constitute a limitation on the electronic device 100. In other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The charging management module 140 is configured to receive a charging input from a charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 may receive an input of the battery 142 and/or an input of the charging management module 140, and supply power to the processor 110, the internal memory 121, the display 194, the camera 193, the wireless communications module 160, and the like.

The power management module 141 may be configured to monitor a performance parameter such as a battery capacity, a quantity of battery cycles, a battery charging voltage, a battery discharging voltage, and a battery health status (for example, electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include one or more filters, one or more switches, one or more power amplifiers, one or more low noise amplifiers (LNA), and the like. The mobile communications module 150 may receive an electromagnetic wave through an antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same device.

The wireless communications module 160 may provide a solution for wireless communications including a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like applied to the electronic device 100. The wireless communications module 160 may one or more components integrated with one or more communication processing modules. The wireless communications module 160 receives an electromagnetic wave through an antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

Figure 2:
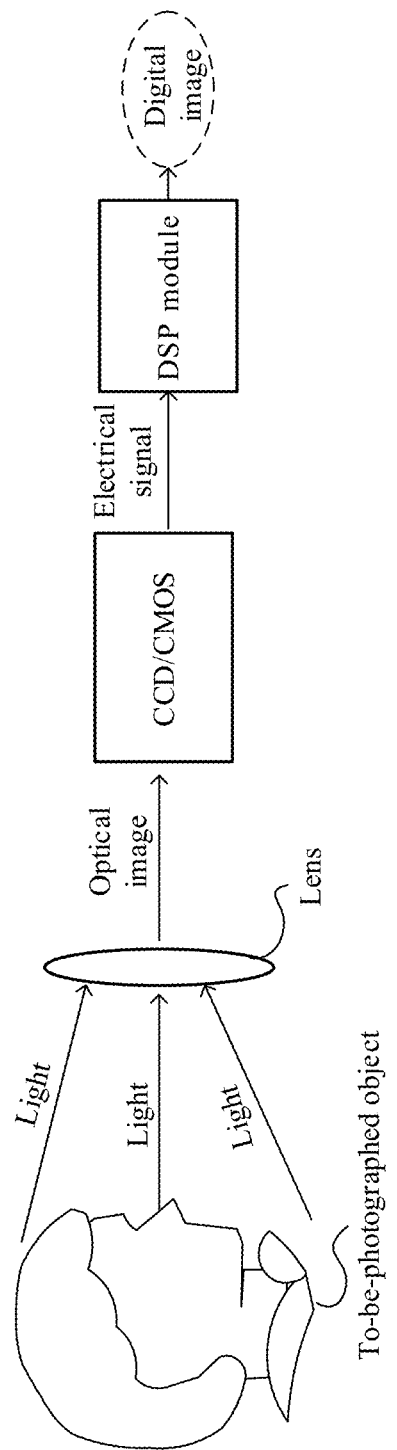
FIG. 2 is a schematic diagram of an operating principle of a camera according to an embodiment of this application.

The camera 193 is configured to capture a static image or a video. In some embodiments, the mobile phone 100 may include one or N cameras, where N is a positive integer greater than 1. The camera 193 may be a front-facing camera or a rear-facing camera. As shown in FIG. 2, the camera 193 usually includes a lens and a photosensitive element (sensor). The photosensitive element may be any photosensitive element such as a CCD (charge-coupled device) or a CMOS (complementary metal oxide semiconductor).

Still as shown in FIG. 2, in a process of capturing a photo or a video, an optical image may be generated after reflected light of a to-be-photographed object passes through a lens, the optical image is projected onto a photosensitive element, and the photosensitive element converts a received optical signal into an electrical signal. Further, the camera 193 sends the obtained electrical signal to a DSP (digital signal processing) module for digital signal processing, to finally obtain each frame of digital image.

The image or the video captured by the camera 193 may be output on the mobile phone 100 through the display 194, or the digital image may be stored in the internal memory 121. This is not limited in an embodiment of the application.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, to enable the electronic device 100 to perform a method for intelligently recommending a contact provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (such as photos and contacts) created during the use of the electronic device 100, and the like. In addition, the internal memory 121 may include a high-speed random access memory, and may further include a non-volatile memory, such as one or more disk storage components, a flash component, or a universal flash storage (UFS). In some other embodiments, the processor 110 runs the instructions stored in the internal memory 121 and/or instructions stored in a memory disposed in the processor, to enable the electronic device 100 to perform a method for intelligently recommending a number provided in the embodiments of this application, various function applications, and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. One or more microphones 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. This is not limited in an embodiment of the application.

Certainly, the electronic device 100 provided in an embodiment of the application may further include one or more components such as a button 190, a motor 191, an indicator 192, and an SIM card interface 195. This is not limited in an embodiment of the application.

To clearly understand the related conventional technology and the embodiments of this application, a brief description of the related technology is first provided.

A field of view (FOV) may also be referred to as an angle of view, and a value of the field of view determines a field of vision of a photographing image captured by an optical instrument (for example, a camera). A larger FOV of a camera means a larger field of vision of a photographing picture, and a smaller FOV of a camera means a smaller field of vision of a photographing picture.

Figure 3:
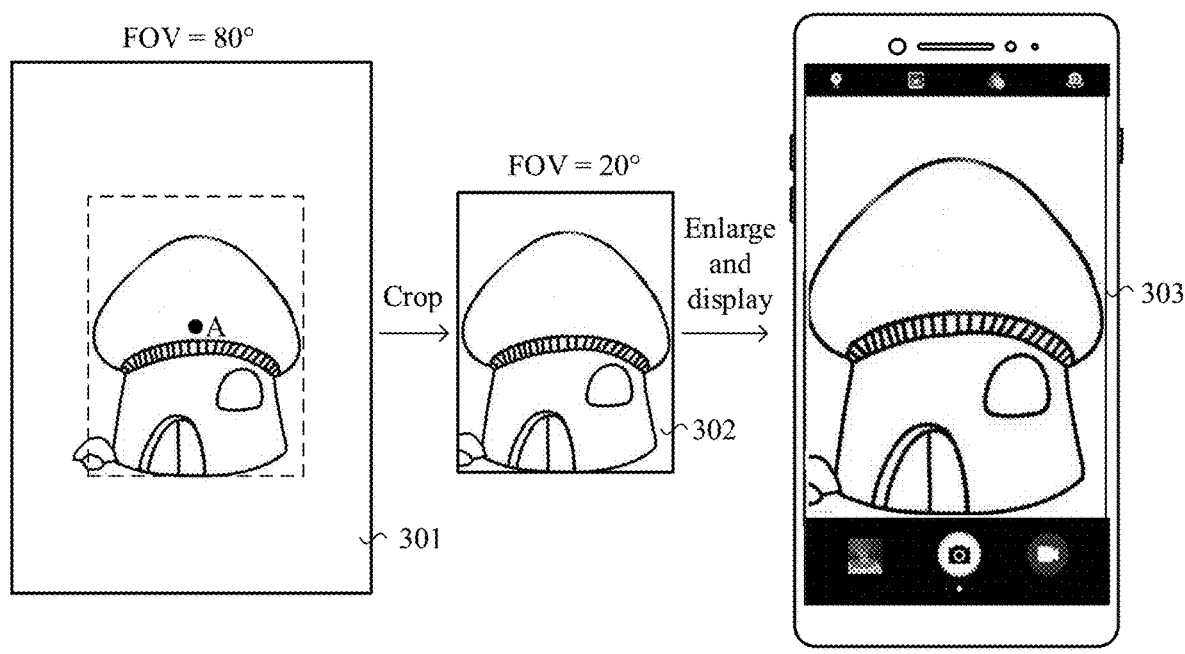
FIG. 3 is a schematic diagram of a principle of digital zoom in the conventional technology.

Digital zoom is to increase an area of each pixel in the photographing image by using a component such as a DSP or a processor in an electronic device, to implement enlargement. That a zoom ratio is 4 (namely, 4× zoom) is used as an example. As shown in FIG. 3, when a camera whose FOV is 80° is used to collect a photographing image 301, if a zoom ratio of 4 is set for the electronic device, it indicates that a user wants to enlarge the photographing image 301 by four times for display. In this case, the electronic device may use a central point A of the photographing image 301 as a center, crop the photographing image 301, and retain a photographing image 302 whose FOV is 20° (namely, 80°/4). Further, the electronic device may display the cropped photographing image 302 in a preview box 303 of the electronic device in an enlargement manner. In this case, the user may view, in the preview box 303, a display effect obtained after the photographing image 301 is enlarged by 4 times.

In the conventional technology, that the electronic device is a mobile phone is used as an example. After obtaining each frame of photographing image through a camera, the mobile phone may first crop the photographing image based on a current zoom ratio. Still as shown in FIG. 3, after the mobile phone obtains the photographing image 301 whose FOV is 80°, if the current zoom ratio is 4, the mobile phone may crop the photographing image 401 to obtain the photographing image 302 whose FOV is 20°. In addition, a fixed crop ratio (init ratio) is preset in the mobile phone, to eliminate an image shake. For example, the crop ratio=10%.

In other words, the mobile phone may further crop the photographing image 302 by 10%, to reduce a shake phenomenon of the photographing image 302.

Figures 4A, 4B:
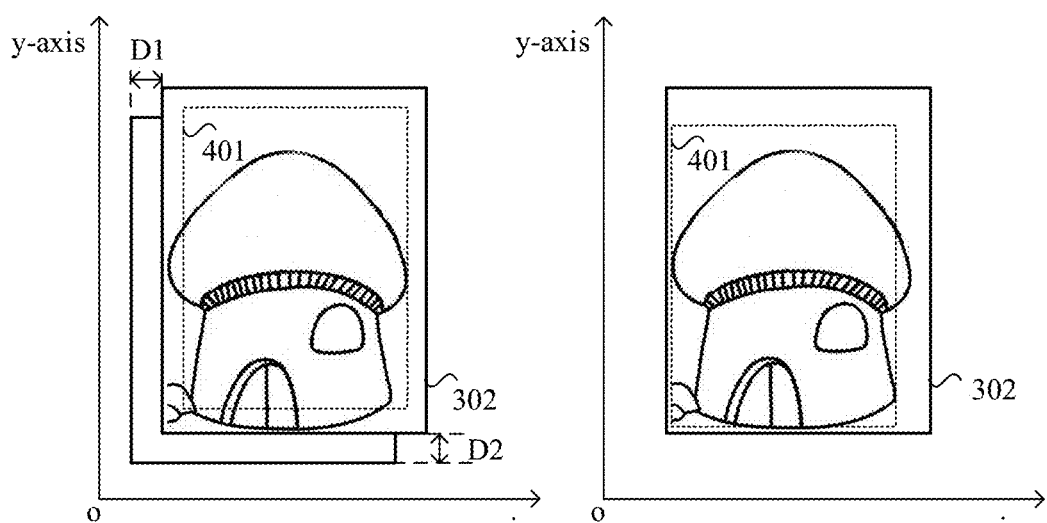
FIG. 4(a) and FIG. 4(b) are a schematic diagram of a principle of performing stabilization processing on a photographing image in the conventional technology.

As shown in FIG. 4(a), the mobile phone may determine a first shake amount D1 on an x-axis of the photographing image 302 and a second shake amount D2 on a y-axis of the photographing image 302 based on a preset stabilization algorithm. That the first shake amount D1 is 1° and the second shake amount D2 is 1° is used as an example. It indicates that a shake of 1° is generated along a positive direction of the x-axis of the currently obtained photographing image 302, and a shake of 1° is generated along a positive direction of the y-axis of the photographing image 302.

Because the FOV of the photographing image 302 is 20°, when the crop ratio is 10%, a corresponding stabilization angle is 2° (namely, 20°×10%). Still as shown in FIG. 4(a), after the photographing image 302 is cropped at the crop ratio of 10%, an FOV of 16° (namely, 20°−20°×10%×2) remains in a crop box 401. As shown in FIG. 4(b), if an initial location of the crop box 401 is located in a center of the photographing image 302, the mobile phone may move the crop box 401 by 1° in a negative direction of the x-axis, and move the crop box 401 by 1° in a negative direction of the y-axis. Further, the mobile phone may crop and output the photographing image 302 based on a current location of the crop box 401, to compensate for the shake that is generated in the positive direction of the x-axis and the positive direction of the y-axis of the photographing image 302.

It can be learned that when the zoom ratio of the photographing image is 4× zoom, a stabilization angle of the photographing image is only 2°. Because the crop ratio used to compensate for the image shake is fixed, a higher zoom ratio of the photographing image indicates a smaller stabilization angle of the photographing image. That an FOV of an initial photographing image is 80° and the crop ratio is 10% is still used as an example. When a zoom ratio of the photographing image is 10× zoom, an FOV of a photographing image obtained after zooming is performed is 8° (namely, 80°/10). In this case, the stabilization angle of the photographing image is only 0.8° (namely, 8°×10%). However, a shake of a photographing image captured by the user in a walk is approximately 3° to 5°, and a shake of a photographing image captured by the user during running may reach more than 10°. It is clear that a stabilization processing method in the conventional technology cannot meet a stabilization requirement of the user in a high-magnification zoom scenario. Consequently, both photographing quality of the photographing image and photographing experience of the user are reduced.

Figure 5:
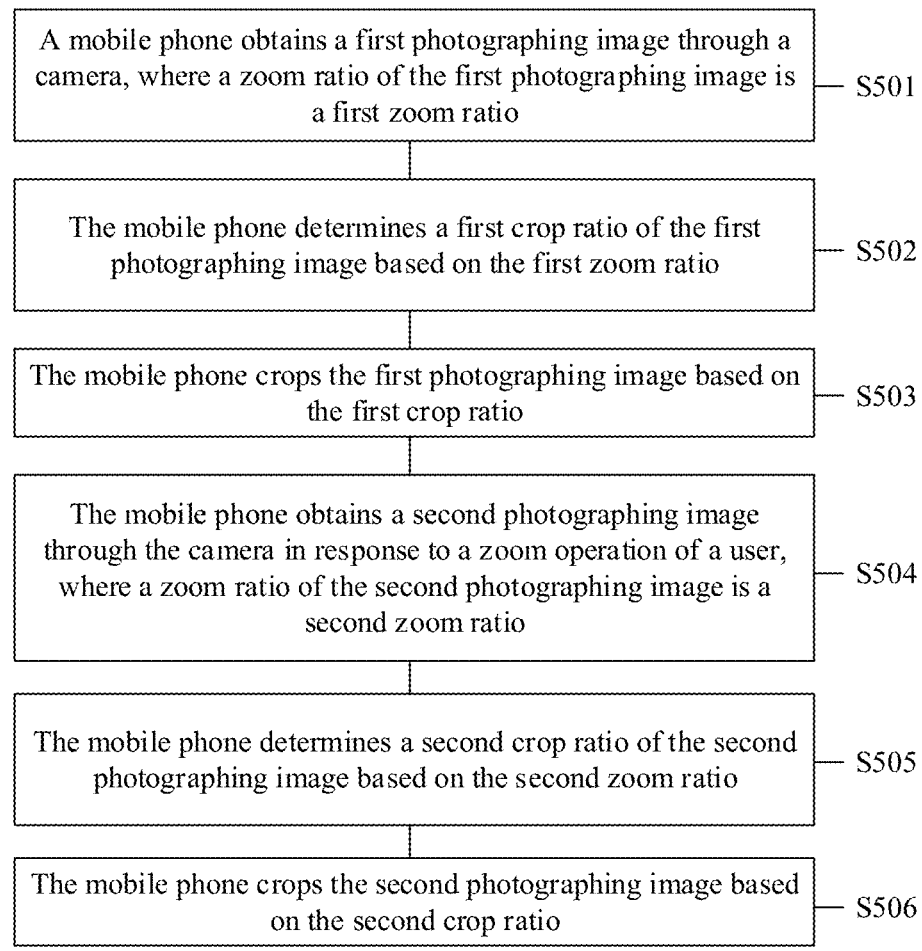
FIG. 5 is a schematic flowchart of a photographing method according to an embodiment of this application.

Therefore, an embodiment of this application provides a photographing method. That the electronic device is a mobile phone is still used as an example. As shown in FIG. 5, the method includes operations S501 to S506.

S501: The mobile phone obtains a first photographing image through a camera, where a zoom ratio of the first photographing image is a first zoom ratio.

Usually, one or more photographing modes such as a photo mode, a video mode, a panorama mode, a slow motion mode, or a time-lapse mode are set in a camera application of the mobile phone. After detecting that the user opens the camera application, the mobile phone may invoke the camera application to enter a photographing mode and open the camera. In this case, the camera may collect each frame of photographing image at a operating frequency. Before storing or displaying the photographing image, the mobile phone may perform anti-shake processing on each frame of photographing image in real time, to reduce a shake phenomenon of the photographing image.

Figure 6:
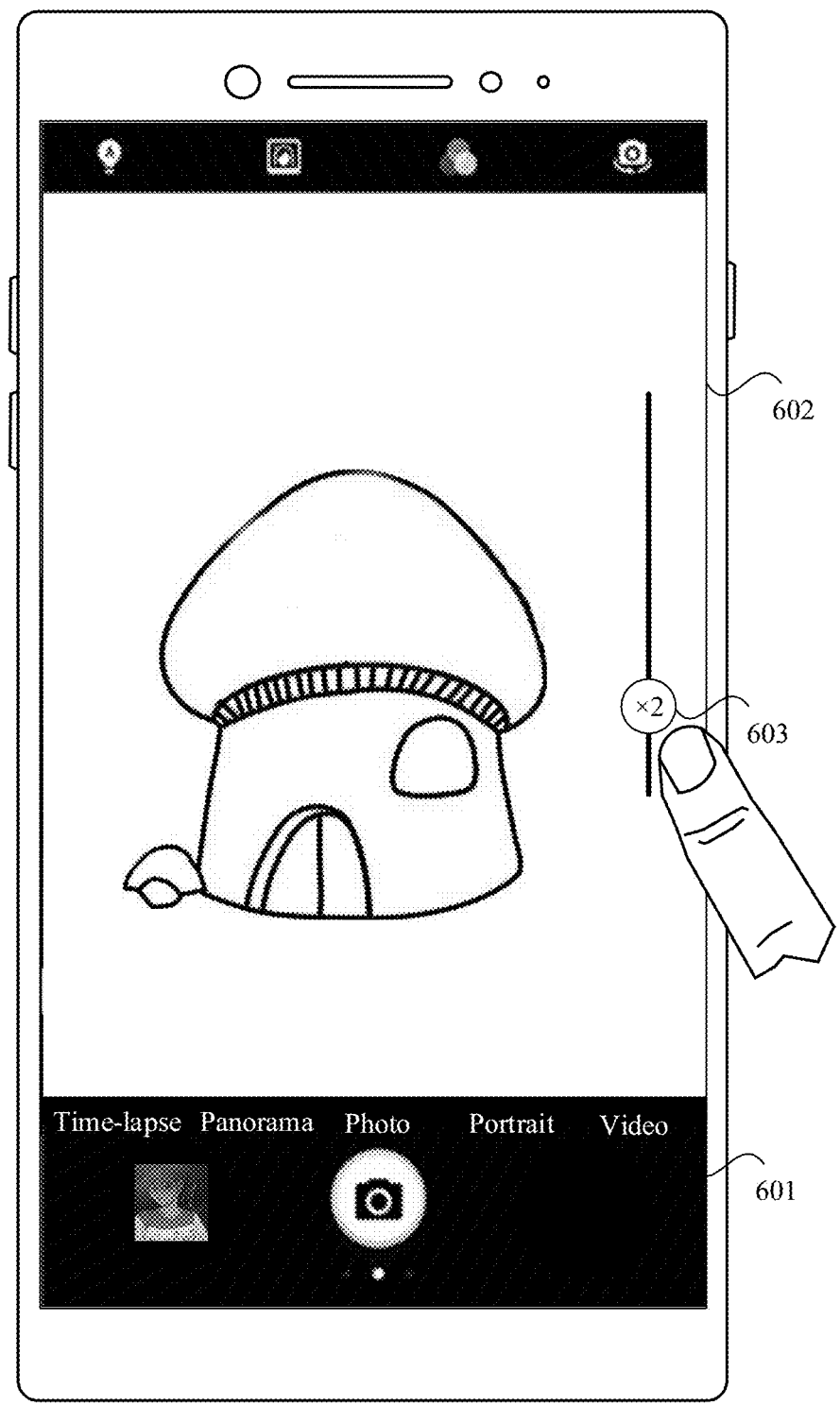
FIG. 6 is a schematic diagram 1 of an application scenario of a photographing method according to an embodiment of this application.

For example, as shown in FIG. 6, after the camera application is opened, the mobile phone may display a preview interface 601 in the photo mode. The preview interface 601 includes a framing window 602, and the framing window 602 may be used to display in real time a preview image existing before a photo is captured. In addition, the preview interface 601 may further include a zoom option 603. The user may select a zoom ratio for current photographing from the zoom option 603, for example, 2× zoom, 4× zoom, or 10× zoom. The mobile phone may display, in an enlargement manner or a shrinking manner based on the current zoom ratio, a photographing image collected by the camera. It should be noted that the zoom option 603 may alternatively be hidden in the preview interface 601. For example, the mobile phone may correspondingly adjust the current zoom ratio based on a pinch operation performed by the user in the framing window 602. Certainly, the mobile phone may alternatively display, in an enlargement manner or a shrinking manner based on a default zoom ratio, the photographing image collected by the camera. This is not limited in an embodiment of the application.

Figure 7:
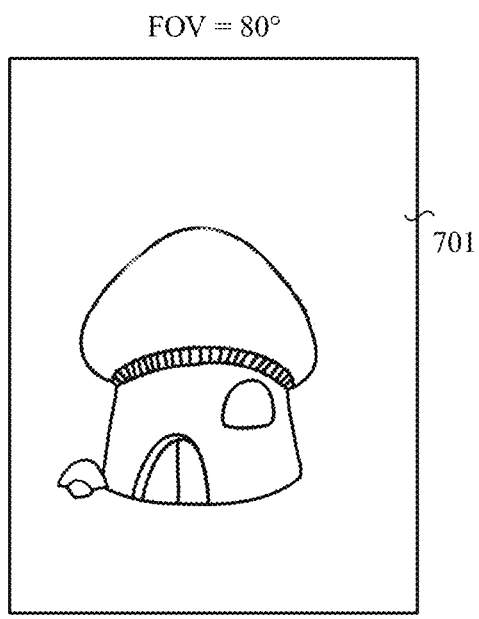
FIG. 7 is a schematic diagram 2 of an application scenario of a photographing method according to an embodiment of this application.

That the current zoom ratio is 2× zoom (namely, the first zoom ratio) is used as an example. An FOV of each frame of photographing image collected by the camera after the camera operates is fixed. For example, when an FOV of the camera is 80°, the FOV of the photographing image collected by the camera is also 80°. For example, as shown in FIG. 7, after the camera application of the mobile phone is opened, the mobile phone may collect, through the camera, a first photographing image 701 whose FOV is 80°. In this case, if the current zoom ratio of the mobile phone is 2× zoom, it indicates that the user wants to enlarge the first photographing image 701 by two times and display the enlarged first photographing image 701 in the framing window 602.

It should be noted that, that the mobile phone obtains the first photographing image 701 in a preview scenario in the photo mode is used as an example for description in FIG. 6. It can be understood that, the mobile phone may alternatively obtain the first photographing image in another photographing mode (for example, the video mode, the panorama mode, the slow motion mode, or the time-lapse mode). For example, the mobile phone may obtain the first photographing image in a preview scenario in the video mode, or may obtain the first photographing image in a photographing scenario in the video mode. This is not limited in an embodiment of the application.

S502: The mobile phone determines a first crop ratio of the first photographing image based on the first zoom ratio.

In an embodiment of the application, after obtaining the first photographing image 701, the mobile phone may set a corresponding crop ratio for the first photographing image 701 based on a current real-time zoom ratio, to crop the first photographing image 701. If the current zoom ratio is large, the mobile phone may set a large crop ratio for the first photographing image 701; and correspondingly, if the current zoom ratio is small, the mobile phone may set a small crop ratio for the first photographing image 701.

For example, after obtaining each frame of photographing image, the mobile phone may calculate a crop ratio (crop_ratio) of a current photographing image according to the following formula (1).

$$\text{crop\_ratio} = \left(\frac{1 - \frac{1}{\text{zoom\_ratio}}}{2}\right) + \frac{1}{\text{zoom\_ratio}} * \text{init\_ratio} \quad \text{Formula (1)}$$

Herein, zoom_ratio is the current zoom ratio, and init_ratio is a preset initial crop ratio. For example, init_ratio may be a constant 10%.

In this case, that the first zoom ratio is 2× zoom is still used as an example. After obtaining the first photographing image 701, the mobile phone may calculate the first crop ratio of $$\text{Firstcropratio} = \left(\frac{1 - \frac{1}{2}}{2}\right) + \frac{1}{2} * 10\% = 30\%.$$

the first photographing image 701 according to the formula (1):

In other words, in a 2× zoom scenario, the first photographing image 701 whose FOV is 80° needs to be cropped by 30%, to meet a zoom requirement for 2× zoom.

In some other embodiments, as shown in Table 1, correspondences that are between different zoom ratios and different zoom ratios and that exist when there is a FOV (for example, 80°) may be further prestored in the mobile phone. Therefore, after obtaining the first photographing image 701, the mobile phone may query a current first zoom ratio. Further, the mobile phone may determine, based on the correspondences shown in Table 1, that a first crop ratio that is of the first photographing image 701 and that corresponds to the first zoom ratio is 30%.

TABLE 1

| Zoom ratio (zoom_ratio) | 1 | 2 | 4 | 10 |
|---|---|---|---|---|
| Crop ratio (crop_ratio) | 10% | 30% | 40% | 46% |

It can be learned that in an embodiment of the application, a crop ratio that is set for each frame of photographing image dynamically changes with reference to the current zoom ratio. However, in the conventional technology, the crop ratio that is set for each frame of photographing image is fixed, for example, a fixed crop ratio of 10%. Therefore, in the conventional technology, after each frame of photographing image is obtained, cropping needs to be first performed for one time based on the current zoom ratio, to meet a current zoom requirement, and then cropping is performed for the second time based on the fixed crop ratio of 10%, to compensate for the image shake that occurs in the photographing image.

In an embodiment of the application, the mobile phone may determine a corresponding crop ratio (namely, crop_ratio) for the photographing image at one time with reference to the current zoom ratio, and subsequently, the mobile phone only needs to crop the photographing image for one time based on the crop ratio. Therefore, the mobile phone may perform cropping for one time based on the entire photographing image (the first photographing image 701), and a stabilization angle that may be used to compensate for the image shake in a cropping process is increased, so that a stable photographing effect of a photographing image captured by the mobile phone can still be obtained when there is a large shake.

Figure 8:
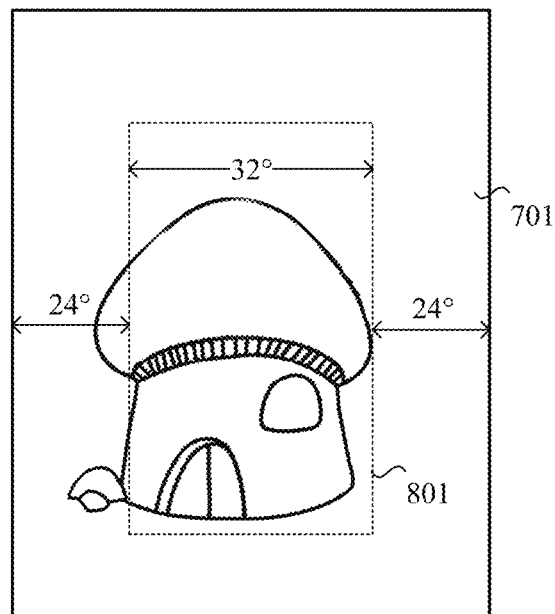
FIG. 8 is a schematic diagram 3 of an application scenario of a photographing method according to an embodiment of this application.

That a crop ratio (crop_ratio) of the first photographing image 701 is 30% is used as an example. As shown in FIG. 8, an FOV of 32° remains after the first photographing image 701 whose FOV is 80° is cropped by 30%. Therefore, the mobile phone may determine, in the first photographing image 701, that a value of an FOV of a crop box 801 is 32°. When the crop box 801 is located in a center of the first photographing image 701, an FOV of 24° remains between each boundary of the crop box 801 and a corresponding boundary of the first photographing image 701. Subsequently, the mobile phone may determine a crop location by moving the crop box 801, to compensate for an image offset generated due to a shake of the mobile phone. However, each remaining FOV of 24° may be used to compensate for the image offset generated due to the shake of the mobile phone. In other words, in a 2× zoom scenario, the stabilization angle of the photographing image may reach 24°, to improve stabilization performance existing during photographing.

That the FOV of the photographing image is 80° is still used as an example. As shown in Table 2, different stabilization angles of the mobile phone may be obtained in the foregoing method in different zoom scenarios. Compared with the conventional technology in which the stabilization angle decreases with an increase in the zoom ratio, in the photographing method provided in an embodiment, the stabilization angle of the photographing image may increase with the increase in the zoom ratio, and therefore, a good stabilization effect can still be obtained in a high-magnification zoom scenario.

TABLE 2

| Zoom ratio (zoom_ratio) | 1 | 2 | 4 | 10 |
|---|---|---|---|---|
| Crop ratio (crop_ratio) | 10% | 30% | 40% | 46% |
| Stabilization angle | 8° | 24° | 32° | 36.8° |

S503: The mobile phone crops the first photographing image based on the first crop ratio.

The first photographing image 701 is still used as an example. Still as shown in FIG. 8, when the crop ratio of the first photographing image 701 is 30%, the mobile phone may determine that the value of the FOV of the crop box 801 in the first photographing image 701 is 32°. Further, the mobile phone may determine a location of the crop box 801 in the first photographing image 701 based on a shake status of the first photographing image 701, and perform cropping, to compensate for an image shake that occurs in the first photographing image 701.

For example, if it is detected that the first photographing image 701 shakes leftwards by 3°, the mobile phone may move the crop frame 801 rightwards by 3° from the center of the first photographing image 701, to compensate for an image offset generated when the first photographing image 701 shakes leftwards by 3°. For another example, if it is detected that the first photographing image 701 shakes upwards by 5°, the mobile phone may move the crop frame 801 downwards by 5° from the center of the first photographing image 701, to compensate for an image offset generated when the first photographing image 701 shakes upwards by 5°.

For example, when collecting the first photographing image 701 through the camera, the mobile phone may further enable a sensor such as a gyroscope to detect an actual displacement of the mobile phone on the x-axis and the y-axis, to be specific, an actual displacement S1 on the x-axis of the first photographing image 701 and an actual displacement S2 on the y-axis of the first photographing image 701. Alternatively, the mobile phone may obtain a previous frame of photographing image adjacent to the first photographing image 701, and further calculate the actual displacement S1 on the x-axis of the first photographing image 701 and the actual displacement S2 on the y-axis of the first photographing image 701 based on an OIS (optical image stabilization) algorithm or an optical flow algorithm.

Usually, a part of actual displacements (namely, S1 and S2) on the x-axis and the y-axis of the photographing image is generated due to actual movement of the user, and the other part is generated due to the shake of the mobile phone. To determine a shake amount that is generated on the x-axis and the y-axis of the first photographing image 701 due to the shake of the mobile phone, after the mobile phone obtains the first photographing image 701, the mobile phone may predict, with reference to latest N (N>1) frames of photographing images, a motion displacement Y1 of the user on the x-axis and a motion displacement Y2 of the user on the y-axis during capturing of the first photographing image 701. Therefore, the mobile phone may calculate the first shake amount (namely, D1=S1−Y1) on the x-axis of the first photographing image 701 and the second shake amount (namely, D2=S2−Y2) on the y-axis of the first photographing image 701.

Figure 9:
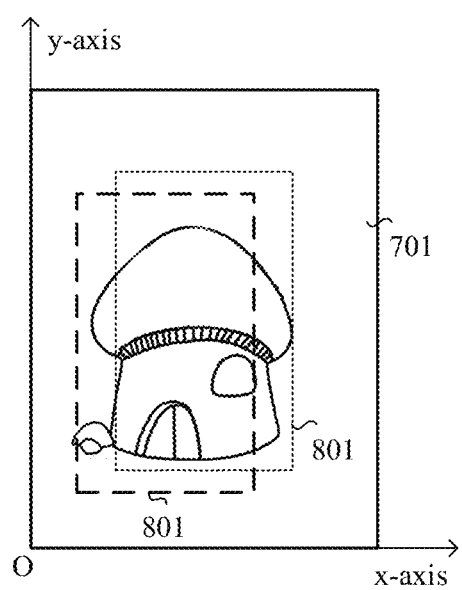
FIG. 9 is a schematic diagram 4 of an application scenario of a photographing method according to an embodiment of this application.

That the first shake amount D1 on the x-axis of the first photographing image 701 is 10° and the second shake amount D2 on the y-axis of the first photographing image 701 is 5° is used as an example. It indicates that a shake of 10° is generated along a positive direction of the x-axis of the first photographing image 701, and a shake of 5° is generated along a positive direction of the y-axis. In this case, as shown in FIG. 9, the mobile phone may move the crop box 801 in the first photographing image 701 by 10° in a negative direction of the x-axis, to compensate for an image offset that is generated due to a shake of 10° in the negative direction of the x-axis of the first photographing image 701. In addition, the mobile phone may move the crop box 801 in the first photographing image 701 by 5° in the negative direction of the y-axis, to compensate for an image offset that is generated due to the shake of 5° in the positive direction of the y-axis of the first photographing image 701.

Because a stabilization angle of the first photographing image 701 is 24°, in other words, when a shake of an angle within 24° is generated in the positive direction (or the negative direction) of the x-axis of the first photographing image 701, and/or when a shake of an angle within 24° is generated in the positive direction (or the negative direction) of the y-axis of the first photographing image 701, the mobile phone may adjust the crop box 801, to compensate for an image offset generated due to an shake, so that a stabilization effect of the mobile phone is significantly improved.

In addition, when the mobile phone captures the first photographing image 701, a shake may be further generated in a z-axis direction. The shake that is generated in the z-axis direction of the first photographing image 701 causes image distortion in the first photographing image 701. Therefore, in addition to adjusting the crop box 801 to eliminate the shake phenomenon of the first photographing image 701, the mobile phone may further eliminate the image distortion in the first photographing image 701 by using a preset warp (distortion) algorithm, to further improve a stabilization effect of the mobile phone.

Figure 10:
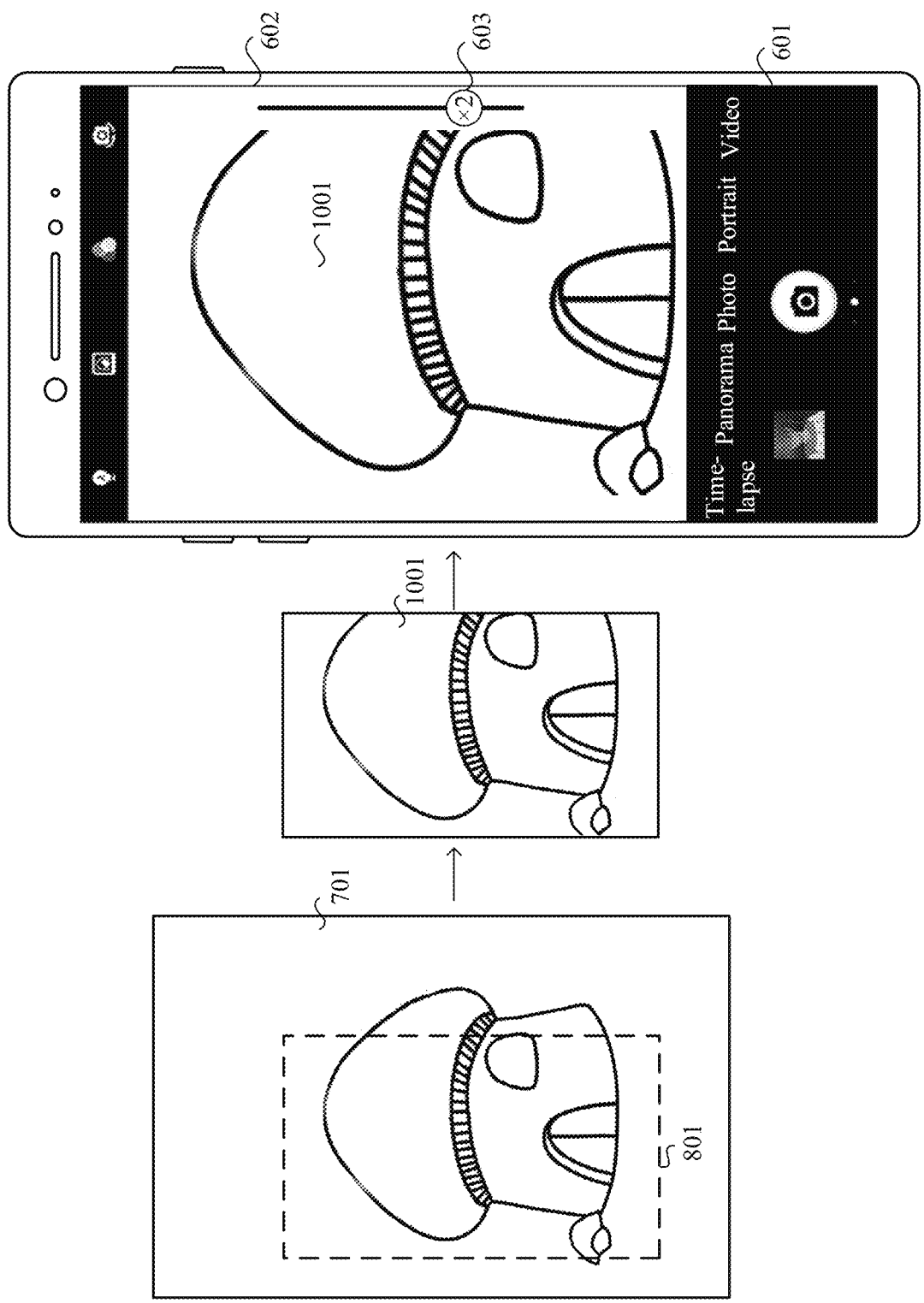
FIG. 10 is a schematic diagram 5 of an application scenario of a photographing method according to an embodiment of this application.

As shown in FIG. 10, after determining the location of the crop box 801 based on shake amounts on the x-axis and the y-axis of the first photographing image 701, the mobile phone may crop the first photographing image 701 based on the location of the crop box 801, to obtain a photographing image 1001 obtained after the first photographing image 701 is cropped. Further, the mobile phone may display, in the framing window 602 of the preview interface 601 in an enlargement manner, the photographing image 1001 obtained after cropping. In this case, not only the photographing image 1001 meets a current zoom requirement for 2× zoom, but also the image offset generated due to the shake of the mobile phone is compensated for, so that the user obtains good photographing experience.

In some embodiments, after cropping the first photographing image 701 to obtain the photographing image 1001, the mobile phone may first store the photographing image 1001 in a cache of the mobile phone. For example, the photographing image 1001 may be stored in a preview cache or a video cache. In a preview scenario of the photo mode or the video mode, the mobile phone may obtain, from the preview buffer in real time, each photographing image that is obtained through cropping, and output the photographing image in the framing window 602 of the preview interface 601. In a video capturing process, the mobile phone may obtain, from the video buffer in real time, each photographing image that is obtained through cropping, and encode the photographing image into a currently recorded video for storage.

In the foregoing embodiment, that the first photographing image 701 is cropped based on the current zoom ratio after the mobile phone obtains the first photographing image 701 is used as an example for description. It can be understood that, when the zoom ratio is the first zoom ratio (for example, the 2× zoom), after obtaining each frame of photographing image, the mobile phone may crop the photographing image in the method described in S501 to S503, to implement zoom and stabilization functions of the photographing image.

S504: The mobile phone obtains a second photographing image through the camera in response to a zoom operation of the user, where a zoom ratio of the second photographing image is a second zoom ratio.

Figure 11:
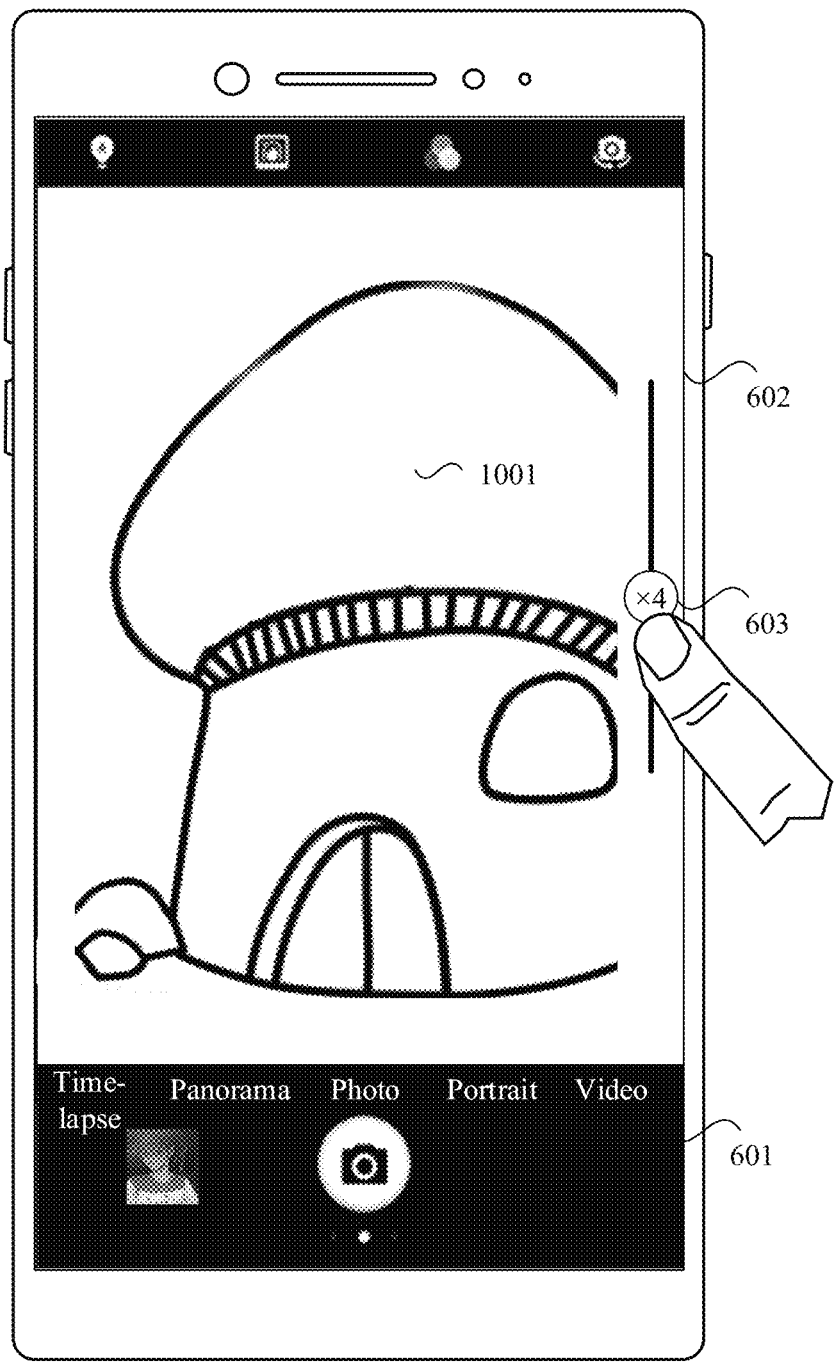
FIG. 11 is a schematic diagram 6 of an application scenario of a photographing method according to an embodiment of this application.

The user may alternatively manually adjust the current zoom ratio in a video preview or capturing process. For example, as shown in FIG. 11, the user may slide the zoom option 603 in the preview interface 601, to adjust the photographing image from 2× zoom (namely, the first zoom ratio) to 4× zoom (namely, the second zoom ratio). After detecting the zoom operation entered by the user, the mobile phone may update the current zoom ratio to 4× zoom.

Figure 12:
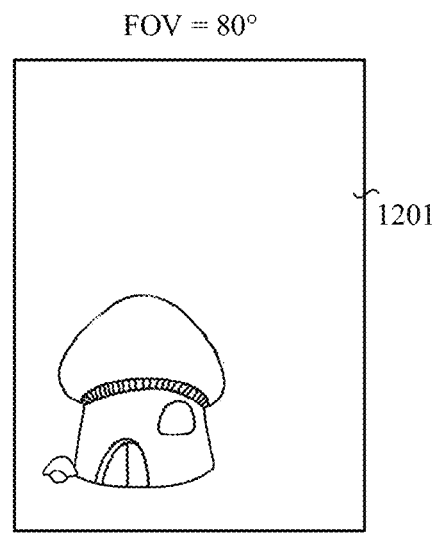
FIG. 12 is a schematic diagram 7 of an application scenario of a photographing method according to an embodiment of this application.

In addition, similar to operation S501, the mobile phone may further obtain the second photographing image through the camera in response to the zoom operation. As shown in FIG. 12, an FOV of a second photographing image 1201 is also 80°. Different from that of the first photographing image 701, the current zoom ratio of the mobile phone is 4× zoom. It indicates that the user wants to enlarge the second photographing image 1201 by four times and display the enlarged second photographing image 1201 in the framing window 602.

In some embodiments, after detecting the zoom operation entered by the user, the mobile phone may further replace a camera that is being used. For example, when it is detected that the user adjusts the photographing image from 2× zoom to 4× zoom, the mobile phone may switch, to a long-focus lens whose FOV is 40°, a pantoscopic lens whose FOV is 80° and that is being used. In this case, an FOV of the second photographing image obtained by the mobile phone is 40°.

S505: The mobile phone determines a second crop ratio of the second photographing image based on the second zoom ratio.

Similar to operation S502, after obtaining the second photographing image 1201, the mobile phone may further determine a crop ratio (namely, the second crop ratio) of the second photographing image 1201 according to the formula (1) or based on the correspondences shown in Table 1.

That the second zoom ratio is 4× zoom is still used as an example. After obtaining the second photographing image 1201, the mobile phone may calculate the second crop ratio of the $$\text{Secondcropratio} = \left(\frac{1 - \frac{1}{4}}{2}\right) + \frac{1}{4} * 10\% = 40\%.$$

second photographing image 1201 according to the formula (1):

In other words, in a 4× zoom scenario, the second photographing image 1201 whose FOV is 80° needs to be cropped by 40%, to meet a zoom requirement for 4× zoom.

Figure 13:
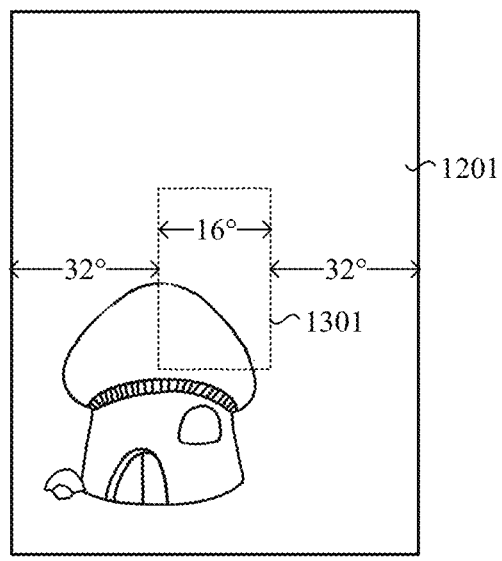
FIG. 13 is a schematic diagram 8 of an application scenario of a photographing method according to an embodiment of this application.

When the second crop ratio of the second photographing image 1201 is 40%, as shown in FIG. 13, an FOV of 16° remains after the second photographing image 1201 whose FOV is 80° is cropped by 40%. Therefore, the mobile phone may determine, in the second photographing image 1201, that a value of an FOV of a crop box 1301 is 16°. When the crop box 1301 is located in a center of the second photographing image 1201, an FOV of 32° remains between each boundary of the crop box 1301 and a corresponding boundary of the second photographing image 1201. The mobile phone may move the crop box 1301, to compensate for the image offset generated due to the shake of the mobile phone, and each remaining FOV of 32° may be used to compensate for the image offset generated due to the shake of the mobile phone. In other words, in the 4× zoom scenario, the stabilization angle of the photographing image may reach 32°, and stabilization performance existing during photographing is significantly improved.

It should be noted that, in the foregoing embodiment, that a camera whose FOV is 80° is still used for photographing after zooming is performed on the mobile phone is used as an example for description. It can be understood that, if the camera with another FOV (for example, the FOV is) 40° is replaced for the mobile phone in response to the zoom operation of the user, the mobile phone may further store correspondences between different zoom ratios and different zoom ratios when the FOV is 40°, and further, the mobile phone may determine the second crop ratio of the second photographing image 1201 based on the second zoom ratio.

S506: The mobile phone crops the second photographing image based on the second crop ratio.

The second photographing image 1201 is still used as an example. Still as shown in FIG. 13, when the crop ratio of the second photographing image 1201 is 40%, the mobile phone may determine that the value of the FOV of the crop box 1301 in the second photographing image 1201 is 16°. Further, similar to operation S503, the mobile phone may determine a location of the crop box 1301 in the second photographing image 1201 based on a first shake amount D1 on an x-axis of the second photographing image 1201 and a second shake amount D2 on a y-axis of the second photographing image 1201, and perform cropping, to compensate for an image shake that occurs in the second photographing image 1201.

Figure 14:
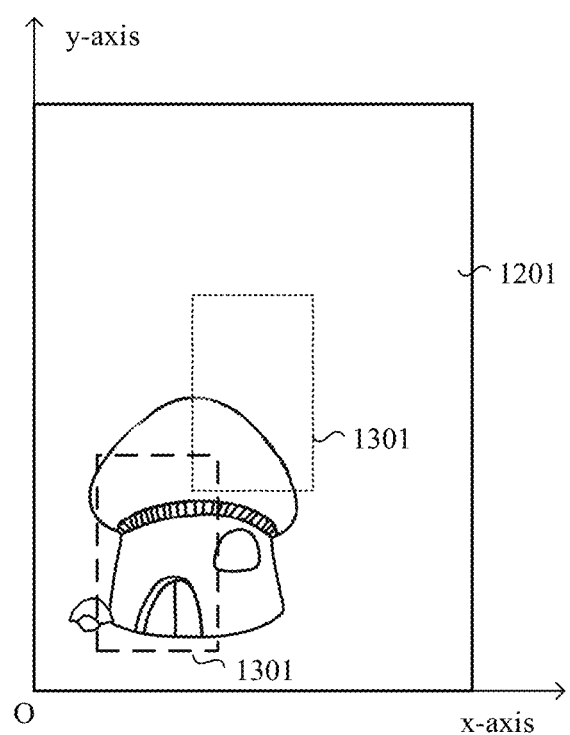
FIG. 14 is a schematic diagram 9 of an application scenario of a photographing method according to an embodiment of this application.

That the first shake amount D1 on the x-axis of the second photographing image 1201 is 20° and the second shake amount D2 on the y-axis of the second photographing image 1201 is 25° is used as an example. It indicates that a shake of 20° is generated along a positive direction of the x-axis of the first photographing image 701, and a shake of 25° is generated along a positive direction of the y-axis. In this case, as shown in FIG. 14, the mobile phone may move the crop box 1301 in the second photographing image 1201 by 20° in a negative direction of the x-axis, to compensate for an image offset that is generated due to the shake of 20° in the positive direction of the x-axis of the second photographing image 1201. In addition, the mobile phone may move the crop box 1301 in the second photographing image 1201 by 25° in a negative direction of the y-axis, to compensate for an image offset that is generated due to the shake of 25° in the positive direction of the y-axis of the second photographing image 1201.

Because a stabilization angle of the second photographing image 1201 is 32°, in other words, when a shake of an angle within 32° generated in the positive direction (or the negative direction) of the x-axis of the second photographing image 1201, and/or when a shake of an angle within 32° is generated in the positive direction (or the negative direction) of the y-axis of the second photographing image 1201, the mobile phone may adjust the crop box 1301, to compensate for an image offset generated due to a shake, so that a stabilization effect of the mobile phone is significantly improved.

Figure 15:
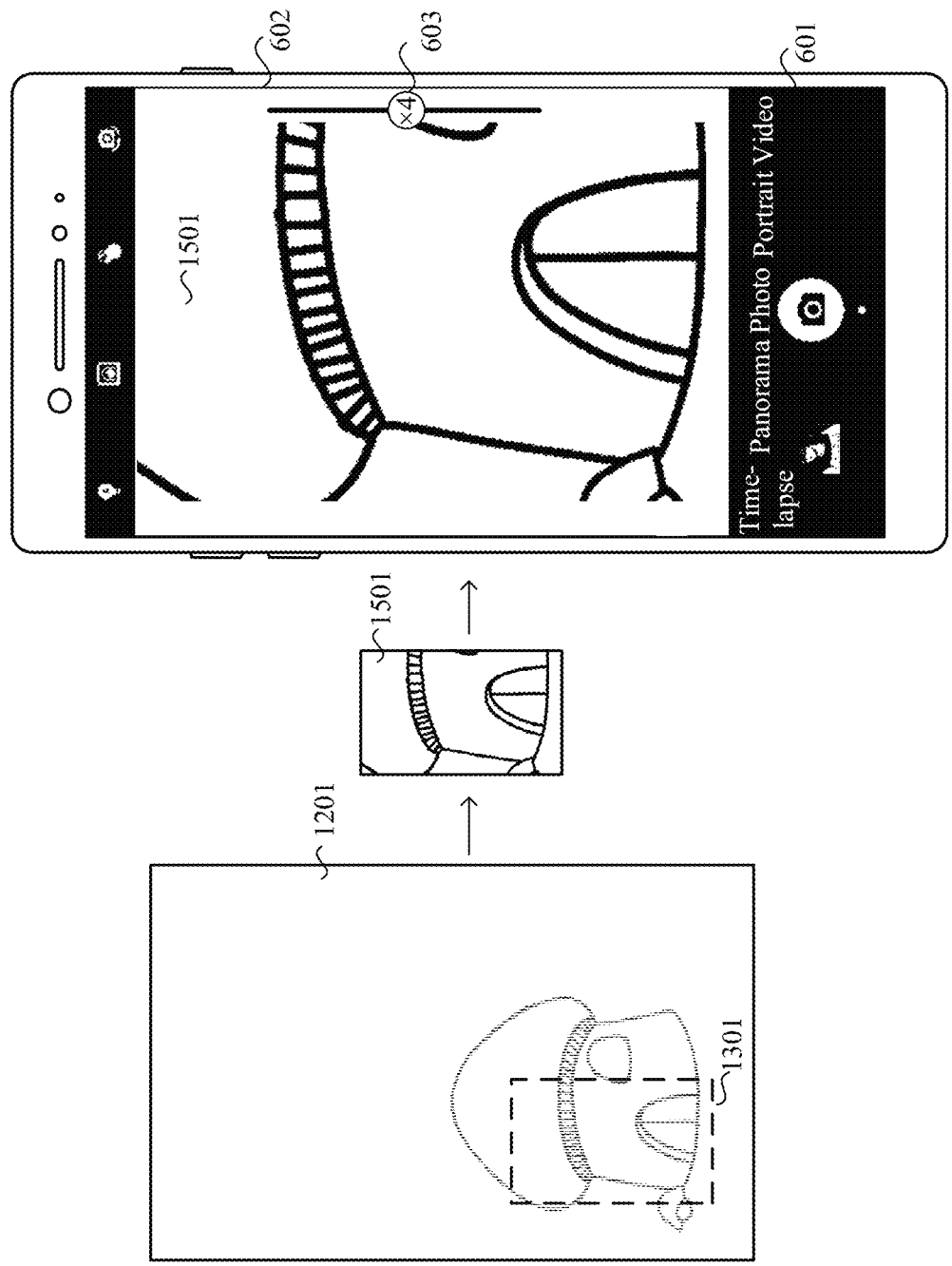
FIG. 15 is a schematic diagram 10 of an application scenario of a photographing method according to an embodiment of this application.

Further, as shown in FIG. 15, after determining the location of the crop box 1301 based on shake amounts on the x-axis and the y-axis of the second photographing image 1201, the mobile phone may crop the second photographing image 1201 based on the crop box 1301, to obtain a photographing image 1501 obtained after the second photographing image 1201 is cropped. Further, the mobile phone may display, in the framing window 602 of the preview interface 601 in an enlargement manner, the photographing image 1501 obtained after cropping. In this case, not only the photographing image 1501 meets a current zoom requirement for 4× zoom, but also the image offset generated due to the shake of the mobile phone is compensated for, so that the user obtains good photographing experience.

For example, when the mobile phone displays the photographing image 1501 in the framing window 602 of the preview interface 601, if it is detected that the user taps a photo button in the preview interface 601, the mobile phone may use, as a current photographing image, the photographing image 1501 currently displayed in the framing window 602, and store the photographing image 1501 in an album of the mobile phone.

Alternatively, when the mobile phone displays the photographing image 1501 in the framing window 602 of the preview interface 601, if it is detected that the user taps a photo button in the preview interface 601, the mobile phone may obtain a photographing image currently collected by the camera, perform zooming and anti-shake processing on the collected photographing image in the cropping method in the operations S505 and S506, use, as the current photographing image, a photographing image obtained after cropping, and store, in an album of the mobile phone, the photographing image obtained after cropping.

It can be learned that, in any one of the photo capturing scenario, the video capturing scenario, the preview scenario, and a recording scenario, after obtaining each frame of photographing image, the mobile phone may dynamically set the crop ratio of the current photographing image based on the current zoom ratio, and the crop ratio may meet the current zoom requirement. In addition, the mobile phone may determine the crop location in the photographing image based on the crop ratio, to compensate for the image offset generated due to the shake of the mobile phone. A larger zoom ratio indicates that the photographing image corresponds to a larger crop ratio. Therefore, a larger zoom ratio indicates a larger stabilization angle that is used to compensate for an image shake and that remains when the mobile phone crops the photographing image. Therefore, in a high-magnification zoom photographing scenario, the mobile phone may still calibrate a photographing image with a large shake angle, to improve stabilization performance existing during capturing of an image and photographing experience of the user.

In addition, when photographing a moving object, the mobile phone may also crop a photographing image in the foregoing method, to satisfy a current zoom ratio and reduce a shake phenomenon of the photographing image.

Figure 16:
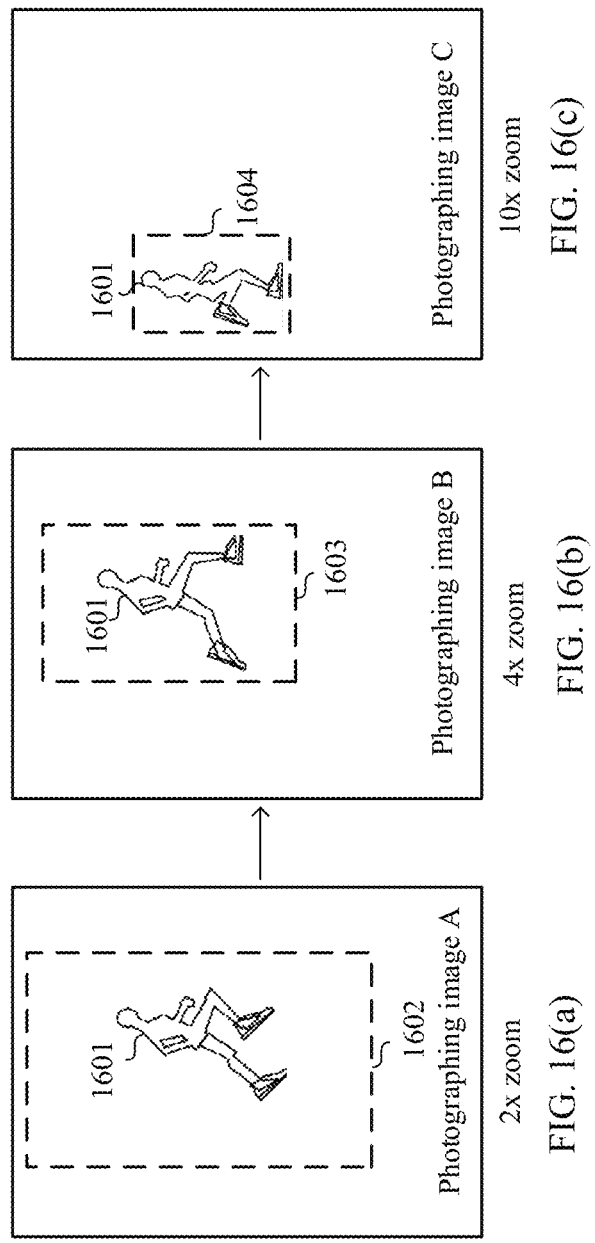
FIG. 16(a) to FIG. 16(c) are a schematic diagram 11 of an application scenario of a photographing method according to an embodiment of this application.

For example, as shown in FIG. 16(a), after obtaining a photographing image A, the mobile phone may identify a moving object 1601 in the photographing image A based on a preset image recognition algorithm. In other words, a current to-be-photographed target is the moving object 1601. In addition, if the current zoom ratio is 2× zoom, the mobile phone may determine, in the method in the foregoing embodiment, that a crop ratio of the photographing image A is 30%, and further, the mobile phone may determine a size of a crop box 1602 in the photographing image A. Further, the mobile phone may determine a location of the crop box 1602 based on a shake amount of the moving object 1601 in the photographing image A, so that the moving object 1601 still occupies a main location in the photographing image after cropping is performed.

When the user adjusts the zoom ratio from 2× zoom to 4× zoom, as shown in FIG. 16(b), the mobile phone may obtain a photographing image B, and identify the moving object 1601 in the photographing image B. If the current zoom ratio is 4× zoom, the mobile phone may determine, in the method in the foregoing embodiment, that a crop ratio of the photographing image B is 40%, and further, the mobile phone may determine a size of a crop box 1603 in the photographing image B. Further, the mobile phone may determine a location of the crop box 1603 based on a shake amount of the moving object 1601 in the photographing image B, so that the moving object 1601 still occupies a main location in the photographing image after cropping is performed.

When the user adjusts the zoom ratio from 4× zoom to 10× zoom, as shown in FIG. 16(c), the mobile phone may obtain a photographing image C, and identify the moving object 1601 in the photographing image C. If the current zoom ratio is 10× zoom, the mobile phone may determine, in the method in the foregoing embodiment, that a crop ratio of the photographing image C is 46%, and further, the mobile phone may determine a size of a crop box 1604 in the photographing image C. Further, the mobile phone may determine a location of the crop box 1604 based on a shake amount of the moving object 1601 in the photographing image C, so that the moving object 1601 still occupies a main location in the photographing image after cropping is performed.

It can be learned that, during photographing of a moving object, the moving object may randomly appear on different locations in a photographing image. Therefore, after obtaining each frame of photographing image, the mobile phone may determine a crop ratio of a current photographing image based on a current zoom ratio, and retain the moving object in the photographing image based on the crop ratio, so that the moving object can smoothly appear on a main location in the photographing image, to reduce composition difficulty existing when the user performs photographing.

The embodiments of this application disclose an electronic device, including a processor, and a memory, an input device, and an output device that are connected to the processor. The input device and the output device may be integrated into one device. For example, a touch sensor may be used as the input device, a display may be used as the output device, and the touch sensor and the display are integrated into a touchscreen.

Figure 17:
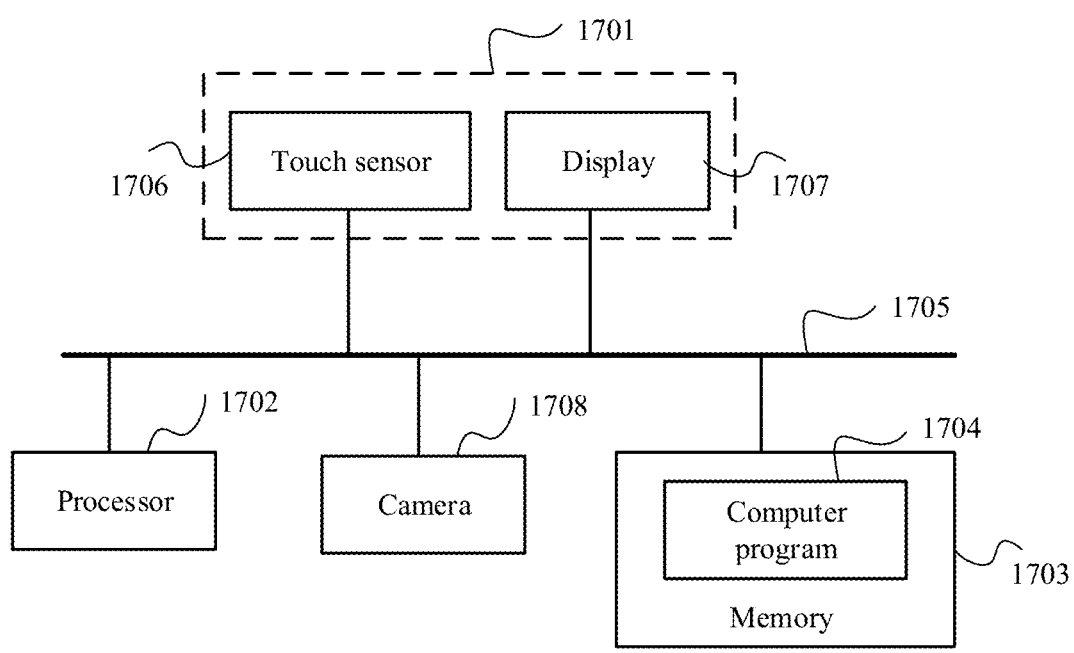
FIG. 17 is a schematic diagram 2 of a structure of an electronic device according to an embodiment of this application.

In this case, as shown in FIG. 17, the electronic device may include a touchscreen 1701. The touchscreen 1701 includes a touch sensor 1706 and a display 1707, one or more processors 1702, one or more cameras 1708, a memory 1703, one or more applications (not shown), and one or more computer programs 1704. The foregoing components may be connected through one or more communication buses 1705. The one or more computer programs 1704 are stored in the memory 1703, and are configured to be executed by the one or more processors 1702. The one or more computer programs 1704 include instructions, and the instructions may be used to perform the operations in the foregoing embodiments. All related content of the operations in the foregoing method embodiments may be cited in function descriptions of corresponding physical devices. Details are not described herein again.

For example, the processor 1702 may be the processor 110 shown in FIG. 1, the memory 1703 may be the internal memory 121 shown in FIG. 1, and the camera 1708 may be the camera 193 shown in FIG. 1. The display 1707 may be the display 194 shown in FIG. 1, and the touch sensor 1706 may be the touch sensor in the sensor module 180 shown in FIG. 1. This is not limited in an embodiment of the application.

The foregoing descriptions about implementations allow one of ordinary skilled in the art to understand that, for the purpose of convenient and brief description, division into the foregoing function modules is used as an example for illustration. In actual application, the foregoing functions can be allocated to different function modules and implemented according to a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely implementations of the embodiments in this application, but are not intended to limit the protection scope of the embodiments in this application. Any variation or replacement within the technical scope disclosed in the embodiments in this application shall fall within the protection scope of the embodiments in this application. Therefore, the protection scope of the embodiments of this application shall be subject to the protection scope of the claims.

What is claimed is:

1. A photographing method, comprising:
obtaining, by an electronic device, a first photographing image having a first zoom ratio through a first camera;
determining, by the electronic device, a first crop ratio of the first photographing image based on the first zoom ratio, wherein the first crop ratio is calculated based on the first zoom ratio according to a preset formula, wherein a stabilization angle of the first photographing image is a product of a field of view (FOV) of the first camera and the first crop ratio, wherein the preset formula is:

$$\text{crop ratio} = \left(\frac{1 - \frac{1}{\text{zoom\_ratio}}}{2}\right) + \frac{1}{\text{zoom\_ratio}} * \text{init ratio},$$

wherein
zoom_ratio is a current zoom ratio, and init_ratio is a constant;
cropping, by the electronic device, the first photographing image based on the first crop ratio, to obtain and output a first cropped image;
obtaining, by the electronic device, a second photographing image having a second zoom ratio through the first camera in response to a first zoom operation entered by a user, wherein the second zoom ratio is greater than the first zoom ratio;
determining, by the electronic device, a second crop ratio of the second photographing image based on the second zoom ratio wherein the second crop ratio is calculated based on the second zoom ratio according to the preset formula, wherein the second crop ratio is greater than the first crop ratio, and wherein a stabilization angle of the second photographing image is a product of the FOV of the first camera and the second crop ratio; and
cropping, by the electronic device, the second photographing image based on the second crop ratio, to obtain and output a second cropped image.

2. The method according to claim 1, wherein the electronic device stores correspondences between different zoom ratios and different zoom ratios;
wherein the determining the first crop ratio of the first photographing image based on the first zoom ratio comprises:
determining, by the electronic device based on the correspondences, the first crop ratio corresponding to the first zoom ratio; and
wherein the determining the second crop ratio of the second photographing image based on the second zoom ratio comprises:

determining, by the electronic device based on the correspondences, the second crop ratio corresponding to the second zoom ratio.

3. The method according to claim 1, wherein the cropping the first photographing image based on the first crop ratio, to obtain the first cropped image comprises:
calculating, by the electronic device, a size of a first crop box based on the first crop ratio;
determining, by the electronic device, a location of the first crop box in the first photographing image; and
cropping, by the electronic device, the first photographing image along the location of the first crop box, to obtain the first cropped image.

4. The method according to claim 3, wherein the determining the location of the first crop box in the first photographing image comprises:
obtaining, by the electronic device, a first shake direction and a first shake amount on an x-axis of the first photographing image, and obtaining a second shake direction and a second shake amount on a y-axis of the first photographing image; and
moving, by the electronic device starting from a first initial location, the first crop box by the first shake amount on the x-axis in a direction opposite to the first shake direction, and moving the first crop box by the second shake amount on the y-axis in a direction opposite to the second shake direction, wherein the first initial location indicates that the first crop box is located in a center of the first photographing image.

5. The method according to claim 3, wherein the first crop box comprises a moving object in the first photographing image, and wherein the second crop box comprises a moving object in the second photographing image.

6. The method according to claim 1, wherein the cropping by the electronic device, the second photographing image based on the second crop ratio, to obtain the second cropped image comprises:
calculating, by the electronic device, a size of a second crop box based on the second crop ratio;
determining, by the electronic device, a location of the second crop box in the second photographing image; and
cropping, by the electronic device, the second photographing image along the location of the second crop box, to obtain the second cropped image.

7. The method according to claim 6, wherein the determining the location of the second crop box in the second photographing image comprises:
obtaining, by the electronic device, a first shake direction and a first shake amount on an x-axis of the second photographing image, and obtaining a second shake direction and a second shake amount on a y-axis of the second photographing image; and
moving, by the electronic device starting from a second initial location, the second crop box by the first shake amount on the x-axis in a direction opposite to the first shake direction, and moving the second crop box by the second shake amount on the y-axis in a direction opposite to the second shake direction, wherein the second initial location indicates that the second crop box is located in a center of the second photographing image.

8. The method according to claim 1, wherein the method further comprises:
obtaining, by the electronic device, a third photographing image through a second camera in response to a second zoom operation entered by the user, wherein an FOV of the second camera is different from the FOV of the first camera.

9. The method according to claim 1, wherein the obtaining the first photographing image through the first camera comprises:
obtaining, by the electronic device, the first photographing image through the first camera in a preview scenario, a video capturing scenario, or a photo capturing scenario.

10. An electronic device, comprising:
a touchscreen, wherein the touchscreen comprises a touch sensor and a display;
one or more cameras;
one or more processors; and
a memory to store instructions, which when executed by the one or more processors, cause the electronic device to perform the following operations:
obtaining a first photographing image having a first zoom ratio through a first camera;
determining a first crop ratio of the first photographing image based on the first zoom ratio, wherein the first crop ratio is calculated based on the first zoom ratio according to a preset formula, wherein a stabilization angle of the first photographing image is a product of a field of view (FOV) of the first camera and the first crop ratio wherein the preset formula is:

$$\text{crop ratio} = \left(\frac{1 - \frac{1}{\text{zoom\_ratio}}}{2}\right) + \frac{1}{\text{zoom\_ratio}} * \text{init ratio},$$

wherein
zoom_ratio is a current zoom ratio, and init_ratio is a constant;
cropping the first photographing image based on the first crop ratio, to obtain and output a first cropped image;
obtaining a second photographing image having a second zoom ratio through the first camera in response to a first zoom operation entered by a user, wherein the second zoom ratio is greater than the first zoom ratio;
determining a second crop ratio of the second photographing image based on the second zoom ratio, wherein the second crop ratio is calculated based on the second zoom ratio according to the preset formula, wherein the second crop ratio is greater than the first crop ratio, and wherein a stabilization angle of the second photographing image is a product of the FOV of the first camera and the second crop ratio; and
cropping the second photographing image based on the second crop ratio, to obtain and output a second cropped image.

11. The electronic device according to claim 10, wherein the memory stores correspondences between different zoom ratios and different zoom ratios;
wherein the determining the first crop ratio of the first photographing image based on the first zoom ratio comprises:
determining, based on the correspondences, the first crop ratio corresponding to the first zoom ratio; and
wherein the determining the second crop ratio of the second photographing image based on the second zoom ratio comprises:
determining, based on the correspondences, the second crop ratio corresponding to the second zoom ratio.

12. The electronic device according to claim 10, wherein the cropping the first photographing image based on the first crop ratio, to obtain the first cropped image comprises:
calculating a size of a first crop box based on the first crop ratio;
determining a location of the first crop box in the first photographing image; and
cropping the first photographing image along the location of the first crop box, to obtain the first cropped image.

13. The electronic device according to claim 12, wherein the determining the location of the first crop box in the first photographing image comprises:
obtaining a first shake direction and a first shake amount on an x-axis of the first photographing image, and obtaining a second shake direction and a second shake amount on a y-axis of the first photographing image; and
moving, starting from a first initial location, the first crop box by the first shake amount on the x-axis in a direction opposite to the first shake direction, and moving the first crop box by the second shake amount on the y-axis in a direction opposite to the second shake direction, wherein the first initial location indicates that the first crop box is located in a center of the first photographing image.

14. The electronic device according to claim 12, wherein the first crop box comprises a moving object in the first photographing image, and wherein the second crop box comprises a moving object in the second photographing image.

15. The electronic device according to claim 10, wherein the cropping the second photographing image based on the second crop ratio, to obtain the second cropped image comprises:
calculating a size of a second crop box based on the second crop ratio;
determining a location of the second crop box in the second photographing image; and
cropping the second photographing image along the location of the second crop box, to obtain the second cropped image.

16. The electronic device according to claim 15, wherein the determining the location of the second crop box in the second photographing image comprises:
obtaining a first shake direction and a first shake amount on an x-axis of the second photographing image, and obtaining a second shake direction and a second shake amount on a y-axis of the second photographing image; and
moving, starting from a second initial location, the second crop box by the first shake amount on the x-axis in a direction opposite to the first shake direction, and moving the second crop box by the second shake amount on the y-axis in a direction opposite to the second shake direction, wherein the second initial location indicates that the second crop box is located in a center of the second photographing image.

17. The electronic device according to claim 10, wherein the operations further comprise:
obtaining a third photographing image through a second camera in response to a second zoom operation entered by the user, wherein an FOV of the second camera is different from the FOV of the first camera.

18. The electronic device according to claim 10, wherein the obtaining the first photographing image through the first camera comprises:

obtaining the first photographing image through the first camera in a preview scenario, a video capturing scenario, or a photo capturing scenario.

\* \* \* \* \*